United States Patent
Sridhar et al.

(10) Patent No.: US 11,997,532 B2
(45) Date of Patent: *May 28, 2024

(54) METHOD AND SYSTEM FOR APPLICATION AWARE CONGESTION MANAGEMENT

(71) Applicant: Sandvine Corporation, Waterloo (CA)

(72) Inventors: Kamakshi Sridhar, Plano, TX (US); Peter Thomas Salanki, Fremont, CA (US); Mostafa Mohamed Hassan, Waterloo (CA); Ty Sayers, Waterloo (CA); Alexander Havang, Waterloo (CA)

(*) Notice: Subject to any disclaimer, the term of this patent is extended or adjusted under 35 U.S.C. 154(b) by 6 days.

This patent is subject to a terminal disclaimer.

(21) Appl. No.: 17/686,563

(22) Filed: Mar. 4, 2022

(65) Prior Publication Data

US 2023/0171637 A1 Jun. 1, 2023

Related U.S. Application Data

(63) Continuation of application No. 16/574,677, filed on Sep. 18, 2019, now Pat. No. 11,297,527.

(Continued)

(51) Int. Cl.
*H04W 28/02* (2009.01)
*H04W 24/08* (2009.01)
*H04W 28/10* (2009.01)

(52) U.S. Cl.
CPC ....... *H04W 28/0289* (2013.01); *H04W 24/08* (2013.01); *H04W 28/0268* (2013.01); *H04W 28/0284* (2013.01); *H04W 28/10* (2013.01)

(58) Field of Classification Search
CPC .............................. H04W 28/10; H04W 24/08
(Continued)

(56) References Cited

U.S. PATENT DOCUMENTS

2015/0003280 A1 1/2015 Colban et al.
2015/0127819 A1 5/2015 Cimino et al.
(Continued)

FOREIGN PATENT DOCUMENTS

WO 2016091298 A1 6/2016

OTHER PUBLICATIONS

Examiner's Report under Article 94(3), European Patent Office, on corresponding Application No. 19198798.1, dated Jan. 31, 2022.
(Continued)

*Primary Examiner* — Angel T Brockman
(74) *Attorney, Agent, or Firm* — Amarok IP Inc.; Neil W. Henderson

(57) ABSTRACT

A method for congestion management on a network including: determining whether a cell on the network is congested; identifying at least one heavy user on the cell; determine traffic flow criteria of the at least one heavy user; and shape network traffic of the at least one heavy user based on the traffic flow criteria of the heavy user. A system for congestion management on a network including: a QoE module configured to determine whether a cell on the network is congested; an analysis module configured to identify at least one heavy user on the cell and determine traffic flow criteria of the at least one heavy user; and at least one shaper configured to shape network traffic of the at least one heavy user based on the traffic flow criteria of the heavy user.

20 Claims, 8 Drawing Sheets

Related U.S. Application Data

(60) Provisional application No. 62/741,106, filed on Oct. 4, 2018.

(58) Field of Classification Search
USPC .......................................................... 370/229
See application file for complete search history.

(56) References Cited

U.S. PATENT DOCUMENTS

| | | |
|---|---|---|
| 2015/0245238 A1 | 8/2015 | Zhang et al. |
| 2016/0065419 A1 | 3/2016 | Szilagyi et al. |
| 2018/0199231 A1 | 7/2018 | Hyun et al. |
| 2020/0112876 A1* | 4/2020 | Sridhar ............. H04W 28/0268 |

OTHER PUBLICATIONS

Extended Supplemental Search Report, European Patent Office on corresponding European Patent Application No. 19198798.1, dated Jun. 2, 2020.

Gerardo Gomez et al, "Towards a QoE-Driven Resource Control in LTE and LTE-A Networks", Journal of Computer Networks and Communications, US, (Jan. 1, 2013), vol. 28, No. 4, doi: 10.1155/2013/505910, ISSN 2090-7141, pp. 303-315, XP055231197.

* cited by examiner

METHOD AND SYSTEM FOR APPLICATION AWARE CONGESTION MANAGEMENT

RELATED APPLICATIONS

The present disclosure is a continuation of U.S. patent application Ser. No. 16/574,677 filed Sep. 18, 2019, and claims priority on U.S. Provisional Application No. 62/741,106 filed Oct. 4, 2018, which is hereby incorporated by reference.

FIELD

The present disclosure relates generally to computer network traffic. More particularly, the present disclosure relates to a system and method for application aware congestion management.

BACKGROUND

Data traffic per mobile user continues to increase all over the world. With the widespread availability of mobile devices having larger screen sizes, and with the availability of rich video content from content providers, mobile users are consuming increasingly larger amounts of data, even though there may be differences in data consumption patterns between networks, markets and subscriber segments. Video applications consume roughly 65-70% of cell traffic and increasingly consume higher bandwidth as 4K content becomes available. Users tend to expect high Quality of Experience (QoE) for at least video, voice and data applications. For streaming video, users expect to see picture frames with no stalls, and a consistently smooth QoE even under challenging radio and mobility conditions. For data, users expect fast download times, and for voice, users expect high voice quality with no call drops.

It is, therefore, desirable to provide an improved method and system for traffic congestion management that can include traffic awareness.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for congestion management on a network, the method including: determining whether a cell on the network is congested; identifying at least one heavy user on the cell; determine traffic flow criteria of the at least one heavy user; and shape network traffic of the at least one heavy user based on the traffic flow criteria of the heavy user.

In some cases, the method may include: identifying at least one suffering user who has Quality of Experience (QoE) below a predetermined threshold; and reviewing the QoE of the at least one suffering user at a predetermined interval to determine if the QoE is improving.

In some cases, the predetermined interval may be every minute.

In some cases, the method may include: reviewing the QoE of all users of the cell to determine whether there remains at least one heavy user and at least one suffering user; and continuing to shape network at least one heavy user based on the traffic flow criteria until there is no longer any suffering user.

In some cases, the method may further include: reviewing the QoE of all users of the cell to determine whether there remains at least one heavy user and at least one suffering user; and continuing to shape network at least one heavy user based on the traffic flow criteria until there is no longer any improvement to user QoE.

In some cases, the traffic flow criteria may include: application type, device type, user quota, device screen size, subscriber location, subscriber mobility, time of day.

In some cases, determining whether the cell is congested may be based on the Throughput, Round Trip Time and Loss experienced by subscribers using the cell.

In some cases, the method may include: determining whether the QoE is improving for the cell; and if the QoE is not improving, ceasing to shape the traffic of the at least one heavy user.

In some cases, a heavy user may have an application throughput greater than a configurable heavy threshold and a suffering user may have round trip time greater than a configurable suffering threshold.

In some cases, the configurable heavy threshold may be equal to a mean throughput for the cell plus a multiple of a standard deviation of the throughput.

In some cases, the configurable suffering threshold is equal to a mean round trip time plus a multiple of a standard deviation of the round trip time.

In another aspect described herein, there is provided a system for congestion management on a network, the system including: a Quality of Experience (QoE) module configured to determine whether a cell on the network is congested; an analysis module configured to identify at least one heavy user on the cell and determine traffic flow criteria of the at least one heavy user; and at least one shaper configured to shape network traffic of the at least one heavy user based on the traffic flow criteria of the heavy.

In some cases, the analysis module may be further configured to: identify at least one suffering user who has Quality of Experience (QoE) below a predetermined threshold; and review the QoE of the at least one suffering user at a predetermined interval to determine if the QoE is improving.

In some cases, the analysis module may be further configured to review the QoE of all users of the cell to determine whether there remains at least one heavy user and at least one suffering user; and the at least one shaper may be configured to continue to shape network at least one heavy user based on the traffic flow criteria until there is no longer any suffering user.

In some cases, the analysis module may be further configured to reviewing the QoE of all users of the cell to determine whether there remains at least one heavy user and at least one suffering user; and the at least one shaper may be configured to shape network at least one heavy user based on the traffic flow criteria until there is no longer any improvement to user QoE.

In some cases, the system may determine whether the cell is congested is based on the Throughput, Round Trip Time and Loss experienced by subscribers using the cell.

In some cases, the analysis module determine the QoE is no longer improving for the cell the at least one shaper ceases to shape the traffic of the at least one heavy user.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DESCRIPTION

Generally, the present disclosure provides a method and system for application aware congestion management. The system and method provided herein are intended to review the Quality of Experience (QoE) of the user of a network to determine whether the network has users that are suffering (i.e. users that might be experiencing or are experiencing a lower QoE) and users that are using a significant portion of the network resources (i.e. heavy users). The system and method are intended to provide for shaping of the traffic of heavy users in order to provide further resources to suffering users. The shaping is intended to be aware of traffic flow criteria, for example, application type of the traffic flow, device type, user quota status, and the like in order to shape the heavy users' traffic in a manner to control/reduce any loss of QoE the heavy users may experience.

Figure 1:
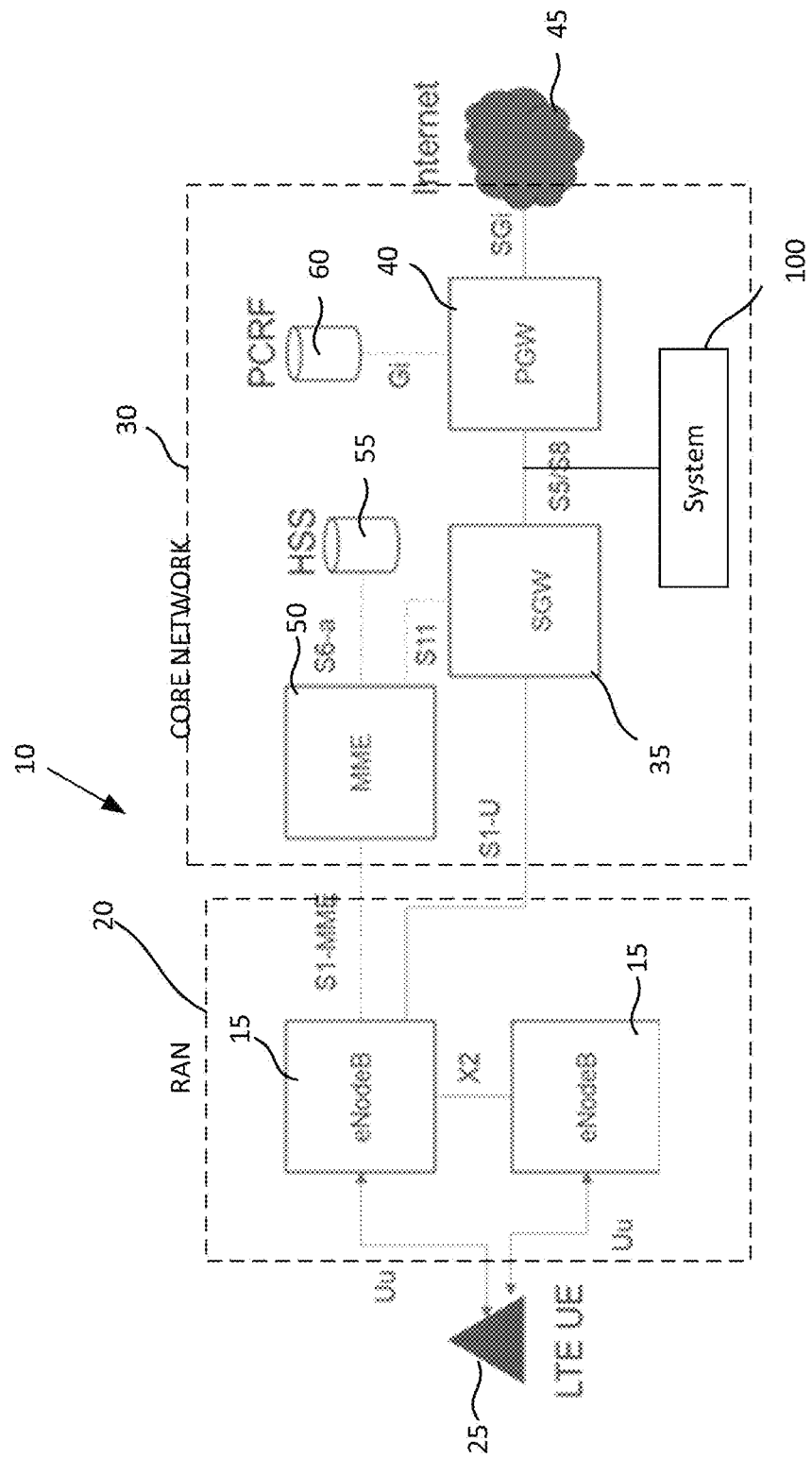
FIG. 1 is diagram illustrating the LTE network architecture.

FIG. 1 shows a diagram of an example of a Long Term Evolution (LTE) network 10 architecture. It will be understood that at least one Evolved Node Base station (eNodeB) resides within the LTE Radio Access Network (RAN) 20. The eNodeB is configured to allocate the network resources among the various LTE users 25. The RAN 20 is in communication with the core network 30. The eNodeB 15 connects to the core network 30 via a serving gateway (SGW) 35 which is further in communication with a packet data network gateway (PGW) 40 which is in communication with the Internet 45. The LTE network 10 further includes a Mobility Management entity (MME) 50 which is configured to track the LTE users 25. The MME 50 interacts with a Home Subscriber Server (HSS) database 55 to provide information with respect to the various users 25 of the LTE 10. The LTE 10 includes a Policy and Charging Rules Function (PCRF) 60, which is intended to provide policy control and flow based charging decisions. It will be understood that FIG. 1 illustrates a high level network architecture and that an LTE network may include further aspects not illustrated. The system and method described herein may further be applied to other networks, for example, LTE-A, 5G networks or any network that uses orthogonal frequency-division multiplexing (OFDM).

A system 100 for application aware congestion management is intended to reside in the core network 30. In particular, the system 100 may be an inline probe north of the PGW 40, between the SGW 35 and PGW 40, or in another location where the system is able to access the data noted herein. It will be understood that in some cases the system may be a physical network device, or may be a virtual network device. In some cases, the system 100 may send data to the cloud to be processed or the system may process the data internally. One of skill in the art will understand that cloud processing includes processing by one or more remote processors and use of remote memory to store data during processing.

Nearly ten years after the first LTE networks were rolled out to support mobile broadband, today's LTE radio networks are increasingly congested due to high volumes of mobile traffic, even with the deployment of higher spectral efficiencies with LTE-A Carrier Aggregation and CoMP features. The growing trend of increased user data consumption and user expectations of high Quality of Experience (QoE) requires operators to attempt to manage cell congestion effectively while continuing to deliver good user QoE for a majority of its users. Generally, network operators would like to maximize the utilization of their 4G assets to optimize user QoE before investing in new 5G radio and network assets. The system and method described herein are intended to raise the overall QoE to suffering users while minimizing the impact on heavy users that may be deprioritized in the process. A general goal is to increase the average QoE of users across a RAN cell to allow for the operator to maintain an acceptable or predetermined level of QoE for a higher number of subscribers.

In LTE networks, it has been observed that a few users can consume a significant percentage of the RAN resources. This results in very good QoE for a few users at the expense of poor QoE for a larger number of users ("suffering users").

RAN schedulers, operatively connected with the eNodeBs, aim to allocate their radio resources, sometimes referred to as Physical Resource Blocks (PRBs) to maximize the spectral efficiency while ensuring some fairness amongst the users scattered around each cell in both good radio conditions and poor radio conditions. Generally, users tend to be uniformly distributed across good channel conditions, such as close to the cell, and poor channel conditions, such as on cell edge.

Given that users in a RAN are scattered across a cell's range, there is a distribution of users in good Radio Frequency (RF) conditions and poor RF conditions. At each LTE Transmission Time Interval (TTI), which are generally set to 1 ms, users close to the base station in good channel conditions (reporting good Channel Quality Indicator (CQI)) will be allocated more PRBs at higher Modulation and Coding Scheme (MCS) by the RAN scheduler compared to users reporting poor CQI values who may either be close to the cell edge or may simply be in poor channel conditions near the cell. Users at the cell edge in poor RF conditions may additionally witness interference from neighboring cells, resulting in substantial loss of throughput. As such, some users, especially users in poor RF conditions may experience a lower QoE.

Proportional Fairness schemes within the Medium Access Control (MAC) scheduler (also referred to as the RAN scheduler) aim to balance the need to maximize spectral efficiency with the need to ensure fairness amongst various users within each cell. An optimization function is generally computed at each TTI interval by the RAN scheduler in deciding how many PRBs to allocate to a user. Generally, the RAN scheduler is effective in maintaining user fairness over short durations through the proportional fair scheduling algorithm that is implemented within the eNodeB. However, the eNodeB is generally unable to maintain fairness over longer durations, for example, several tens of seconds and longer.

It has been noticed that users who are in good channel conditions generally get incrementally more radio resources most of the time. Over time, this cumulatively aggregates for long duration flows. As a result, a few users (for example, 5% of users) are able to get significantly larger proportion of the radio resources compared to other users resulting in much higher sustained throughputs over longer durations. This effect tends to result in very good QoE for a few users and poor QoE for other users which is particularly exacerbated for long duration flows, for example, flows of several tens of seconds or longer.

This problem of poor user QoE is compounded by the fact that operators like to maximize Spectral Efficiency as much as possible because it enables the operator to substantiate claims such as a 'network with the highest throughput'. Fairness amongst users tends to be of lower priority to the operator, although users experiencing below average QoE may be more likely to churn through network operators.

The embodiments of a system and method detailed herein are intended to provide a solution that aims to enable a larger number of users getting increasing fair share of the radio resources when the mismatch between the QoEs of various users is high. This is intended to improve the QoE of the majority of the cell users. In some cases, the system and method detailed herein are intended to take into account specific applications, device screen sizes, and network performance metrics such as Throughput, RTT and Loss, to determine which users may experience further shaping of their network traffic. It is intended that, as only heavy users, for example users whose throughput is more than 2 standard deviations above the mean, are intended to be deprioritized, the majority of users will experience greater QoE.

With reference to FIG. 1, an end-to-end application flow originating at the content source traverses to the PGW 40 to the SGW 35 to the aggregation networks to the eNodeB 15 and then to the user 25. The QoE of an application flow may depend on several parameters including: the load and the performance on the RAN, the backhaul and the core, the application specific characteristics and the like.

Each application has a typical data traffic profile that may be characterized by, for example, a maximum bit rate, allowable packet loss, maximum tolerable latency, maximum tolerable jitter and the like. Each element within the data traffic profile contributes to the user's QoE for the traffic flow. Applications such as stream video, for example Netflix, YouTube, and the like, are characterized by high bit rates and low loss but may be relatively tolerant to jitter and latency to within a few seconds. Real time applications, such as gaming, may have much lower bit rates; however, the bits may need to be delivered to end users with low packet loss, low latency and low jitter. Web traffic may be characterized by data profiles have quick bursts of traffic, where the bits are sent in burst during short intervals followed by long breaks or silences. As such, web traffic may be characterized by low loss but may be able to tolerate high latency and high jitter. QoE of the end user depends on the ability of the network to support the varying application specific demands. Factors such as end user buffer depth, user device size and user mobility may further affect the QoE of the end user.

One method to manage congestion may be to have the RAN 20 (for example, the eNodeB), deprioritize the traffic of heavy users. Unfortunately, the RAN congestion control mechanisms have traditionally only had visibility into network performance parameters, which may be limited to throughput or may also include RTT/packet loss between the User Equipment (UE) and the eNodeB. These limited network performance metrics may then be used by the RAN to decide which users to deprioritize.

The eNodeB scheduler can generally measure and record bytes sent out per user flow. It can aggregate these bytes to derive instantaneous and average throughputs measured over some configurable time window. The eNodeB can measure aggregate throughputs for multiple user flows. Heavy users are those, whose throughputs (averaged over a short configurable time) are significantly higher than the throughputs of the population of users being served by the eNodeB. These users consume significantly higher radio resources (PRBs) than the other users. However, the eNodeB typically does not, keep state machines over long durations.

Deprioritization in the RAN uses priority weight functions within the eNodeB scheduler that may underweigh the heavy users in the eNodeB scheduler to achieve a similar, if not higher, increase in the throughputs experienced by the non-heavy users. The end result of deprioritization is that the RAN scheduler can shift resources from the heavy users to the typical users, but, with lack of visibility into greater detail, the shift may not achieve the goal of improving QoE to some users, for example, those with a poor cell signal.

It has been noted that the traditional method of the deprioritization action, which is enforced at the RAN scheduler, based on throughput, Round Trip Time (RTT), and/or loss measurement statistics at the eNodeB, has limitations. In particular, the RAN based congestion management approach generally uses the heavy user throughput over time to decide which users to deprioritize. While this conventional process may examine RTT and loss between the UE and the eNodeB, this traditional method for deprioritization does not always factor RTT and Loss into the approach.

Even if RTT and/or loss were used to assist in the RAN deprioritization method, the RAN does not have knowledge of end-to-end network performance statistics for a traffic flow. The RAN does not have visibility into the RTT/packet loss on the backhaul between the eNodeB and the aggregation network, the aggregation network and the SGW, and between the SGW and the PGW. Backhaul bottlenecks, which are common, can severely skew the perceived flow performance and therefore alter the optimal assignment of radio resources needed to provide improved or optimal QoE.

Conventionally, in the RAN, the eNodeB does not have awareness of Applications (other than the high level LTE QCI (0 to 9)) when deciding which users to deprioritize. Since many applications practically fall under the best effort category of LTE QCI 8 or 9, the RAN does not have the visibility needed to selectively shape different heavy users for optimal RAN performance based on the application and the traffic flow, for example, Peer-to-Peer, Video flows, Web traffic and the like. As different application types react differently to deprioritization, the system and method detailed herein are intended to have application awareness to more effectively manage congestion.

It was also determined that the RAN has no awareness of user equipment (UE characteristics such as, device type, device size or the like, when deciding which users to shape and to what extent. It is desirable to have a solution that considers these characteristics in order to shape based on characteristics that are less likely to provide the user with a lower QoE, for example, it may be preferable to shape users watching video on an iPhone compared to an iPad or the like. The system and method detailed herein are intended to have awareness into UE characteristics which allows the deprioritization to be based on varying application types, video resolutions and codecs, for example.

It has been determined that the solution currently enabled by the eNodeB does not assess the impact on the QoE on the other users who would benefit and therefore the extent of shaping may not be appropriate with respect to the traffic mix in the cell.

Thus, traditional RAN deprioritization techniques may not increase the QoE of the majority of the users because there is little or no contextual awareness used to decide which users to shape and by what extent. The method and system proposed herein are intended to permit a higher number of users to experience better QoE and thus allows the network operator to support a higher number of users. In general, the number of users connected to a single RAN cell is negatively correlated with average QoE of users on the cell. By increasing the user QoE for a number of users, the operator of the cell may benefit from higher average user QoE or allow the operator to increase the cell user capacity without negatively impacting overall user QoE.

The embodiments of the system and method disclosed herein are intended to improve QoE of suffering users in a congested RAN cell by selectively shaping the traffic of certain users while monitoring the application QoE of all of the users. In one embodiment, the end-to-end performance statistics are available at the SGi interface, which connects the PGW to an external network, where the system may be implemented. User QoE improvement may be accomplished through contextual aware traffic shaping that detects cell congestion and decides, for example, which heavy users should be shaped, how aggressively to shape and when to stop shaping based on associated criteria beyond just RAN congestion metrics. In doing so, the system and method are intended to implement a closed loop congestion control mechanism that senses the network condition and takes appropriate action to enable improvement in application based QoE.

As used herein, an embodiment of the closed loop congestion control mechanism may generally include two key elements and four key actions. The first element is the end-to-end LTE network, and the second element is the method detailed herein. In an open loop system, the network delivers the traffic to the end user but does not make any adjustments to the network operating parameters based on any performance or quality information the network may determine from the end user. As a result, if the user QoE suddenly becomes poor, the network is not informed and as a result does not take any corrective action. There is no role for any supporting methods in an open loop system.

In a closed loop system, the network works with a method, for example the method described herein and supports, for example, four distinct actions. The network provides performance measurements for the user equipment (UE) such as Throughput, RTT and Loss (first action). The method takes these measurements, analyzes them and derives insights based on the analysis (second action) and then takes specific actions on the network (third action) based on the derived insights. The method may then wait for a predetermined amount of time for these actions to take effect on the network (fourth action). After the predetermined amount of time, it is expected that the end user performance will improve, remain same, or in some situations, degrade. Accordingly, the effect of taking these four actions becomes evident in the measurements available from the UE. The closed loop cycle may repeat at predetermined time intervals in a manner that allows the method to steer the network towards a desirable operating point such as improving the application QoE for its users. Because a closed loop system is able to take in UE measurements in near-real time and process them, the method and system described herein is able to react to the changes happening within the network such as, a sudden increase in network load, a sudden change in application type, or the like, while constantly trying to improve the end user QoE metrics. The closed loop system described herein is extended to the end-to-end network and supports the method of congestion management described herein to improve the end user QoE.

This closed loop control of the system measures parameters such as Throughput, end-to-end (e2e), RTT, and the like, and introduces selective user deprioritization in the core which detects and tags Heavy Users, and shapes them selectively based on various traffic flow criteria for example, application type, device type, device screen size, subscriber location, subscriber mobility, user quota and the like. The shaping may continue until the QoE of any suffering users, which may be determined based on application specific QoE metrics, improves. The extent of shaping may depend on how well the QoE of the suffering users improves.

As the embodiments of the method and system are intended to be congestion-aware, the deprioritization approach may only be invoked when the heavy users take up significant radio resources over all other users and is not invoked when the cell loading is light. Since this algorithm runs in the core, it can use a variety of measurements such as e2e RTT and throughputs to decide the degree of shaping to apply. This closed loop intelligent throttling of a few heavy users is intended to improve the RTT of the suffering users.

Figure 2:
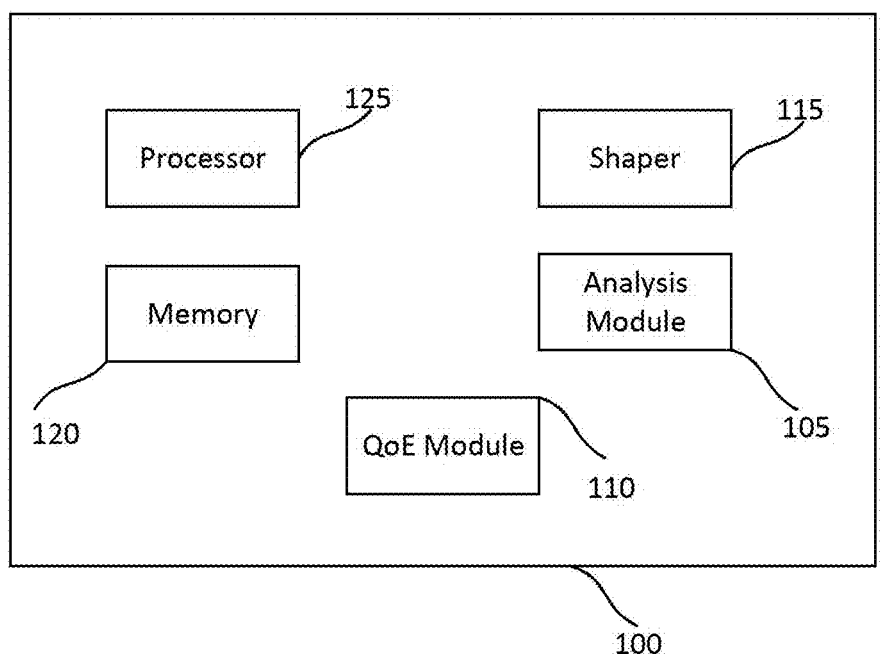
FIG. 2 illustrates a system for application aware congestion management according to an embodiment.

FIG. 2 illustrates an embodiment of a system 100 for application aware congestion management. The system includes an analysis module 105, a QoE module 110, at least one shaper 115, at least one processor 120 and at least one memory component 125. The system 100 is intended to reside on the core network but, as noted, may be remote or access remote resources, while having a connection to the core network. The modules, including the processor 120 and memory 125, are in communication with each other but may be distributed over various network devices or may be housed within a single network device. The system 100 is intended to receive information from the LTE network equipment that allows the system 100 to determine traffic flow criteria, including application type, device characteristics, user quota, time of day, ongoing events and the like. In some cases, the system may determine whether an ongoing event may be affecting the traffic flow, for example, a large congregation of people at a single venue may adversely affect traffic in an associated cell. The at least one shaper of the system is then intended to shape traffic based on the traffic flow criteria. Traffic flow criteria are intended to capture detail with respect to the user, application and device associated with the flow. Traffic flow criteria may include, for example, application type, device type, device screen size, subscriber location, subscriber mobility, user quota, total duration of individual subscriber application flows as compared against a baseline per subscriber average of the duration of traffic flows from other subscribers and the like.

The QoE module 110 may receive Throughput, RTT, loss and/or other data associated with congestion metrics, including QoE related data, with respect to, for example, a cell. In some cases, the system may work with a plurality of cells, for example, cells in a predetermined area or the like. The QoE module 110 is configured to process this data to make a determination of whether the cell is congested and that the data flow would benefit from further shaping by the at least one shaper 115.

On determining if the cell is congested, the analysis module 105 may review the traffic flows to determine users using significant network resources, referred to as heavy users, and users with lower QoE, referred to as suffering users. The suffering users may generally be using fewer network resources but this is not necessarily the case. The analysis module 105 is intended to review various traffic flow criteria in order to determine which traffic flows to heavy users would be preferred to be shaped based at least on the traffic flow criteria, for example, the device type, the user quota, the application type of the traffic flow and the like. Once the analysis module determines the flow to be shaped, the at least one shaper 115 will shape the traffic flow based on the analysis. Shaping may be accomplished by deprioritizing at least one traffic flow to a heavy user as described herein. The analysis module 105 may communicate shaping commands either directly to the at least one shaper 115, onto a control module which may then send shaping commands to a shaper or a controller in an appropriate cell.

The system 100 may measure QoE and determine QoE metrics at predetermined intervals, for example, ever 10 seconds, every minute, every 10 minutes or the like. The QoE module 110 may determine that the cell is no longer congested and that shaping can stop, that the QoE still needs further adjustment, or that although congested, the QoE is acceptable for the various users of the congested cell.

The memory component 125 is configured to store data related to the system 100, for example, rules or policies related to shaping traffic flows, user quotas, predetermined rankings of various applications and related traffic flows, and the like.

Figure 3:
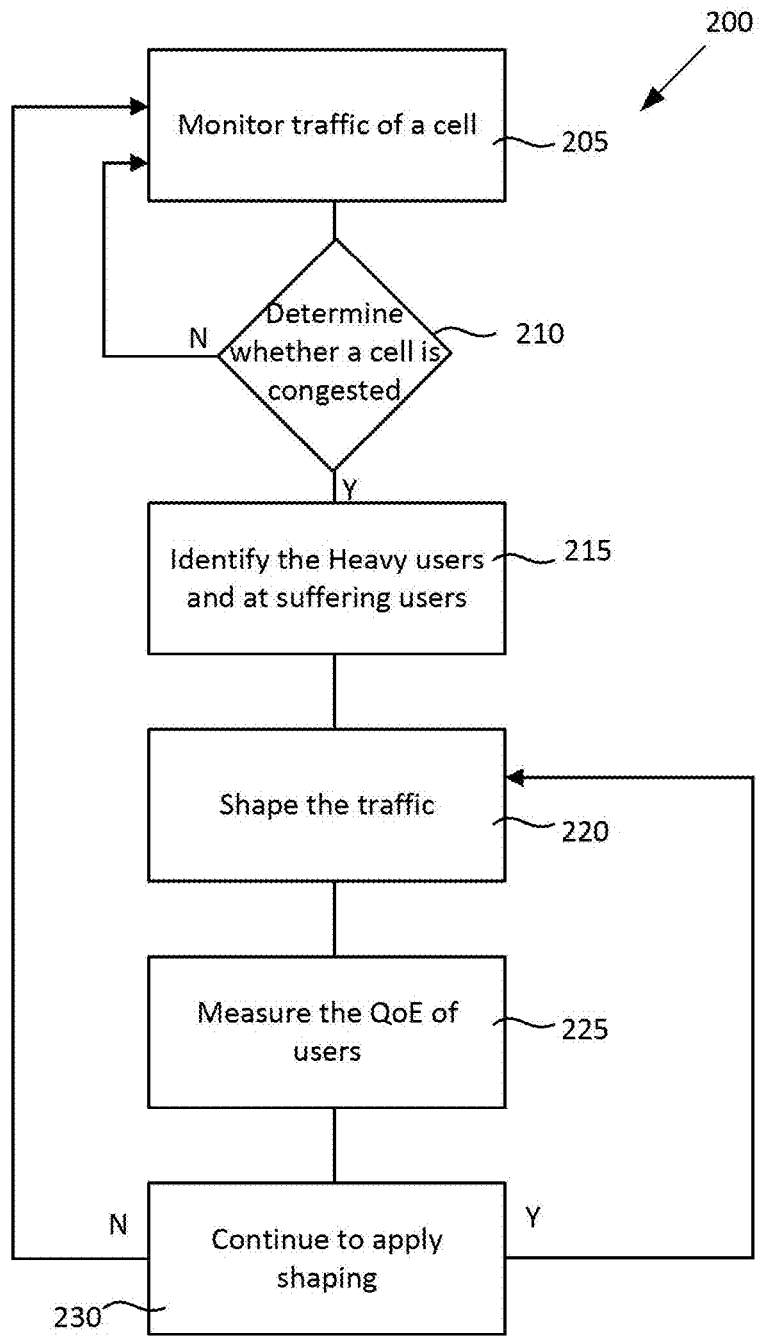
FIG. 3 is a flow chart illustrating a method for application aware congestion management.

FIG. 3 illustrates a method 200 for application aware congestion management. The system monitors traffic flows associated with, for example, a cell, at 205. It will be understood that the system may be monitoring traffic flows of a plurality of cells and may be analyzing the traffic flow of each of the plurality of flows independently to apply shaping to each of the congested cells independent of one another or in co-ordination to apply shaping on more than one cell in a co-ordinated manner.

The system may then determine whether a cell is congested, at 210. If a cell is not congested, the system, for example the QoE module 110, may continue to monitor the cell at various predetermined intervals.

If the system determines the cell is congested, for example, via the QoE module, the analysis module 105 may analyze the traffic flows to determine heavy users and suffering users, at 215. The at least one shaper 115 may then shape the traffic based on the analysis of which heavy user would be least affected by having the traffic flow shaped, at 220. The determination as to which user would be least affected may be based on the traffic flow characteristics. After the at least one shaper 115 has shaped the traffic for a predetermined interval, the congestion on the cell and/or the QoE of the users of the congested cell (including the heavy users and/or suffering users) may be reviewed, at 225. The system may then determine whether further shaping needs to be applied, whether the applied shaping has benefitted the suffering users, or whether the cell is no longer congested and no further shaping is required, at 230. It will be understood that the review and determination at 225, 230 may be similar to the monitoring and determination at 205 and 210.

In a specific example, a traffic flow may include various application flows, each with its own QoE metrics. Every 1 minute, a snapshot of measured data in each cell (for example, Throughput and RTT) is available. It will be understood that other time intervals may also be used.

Figure 4:
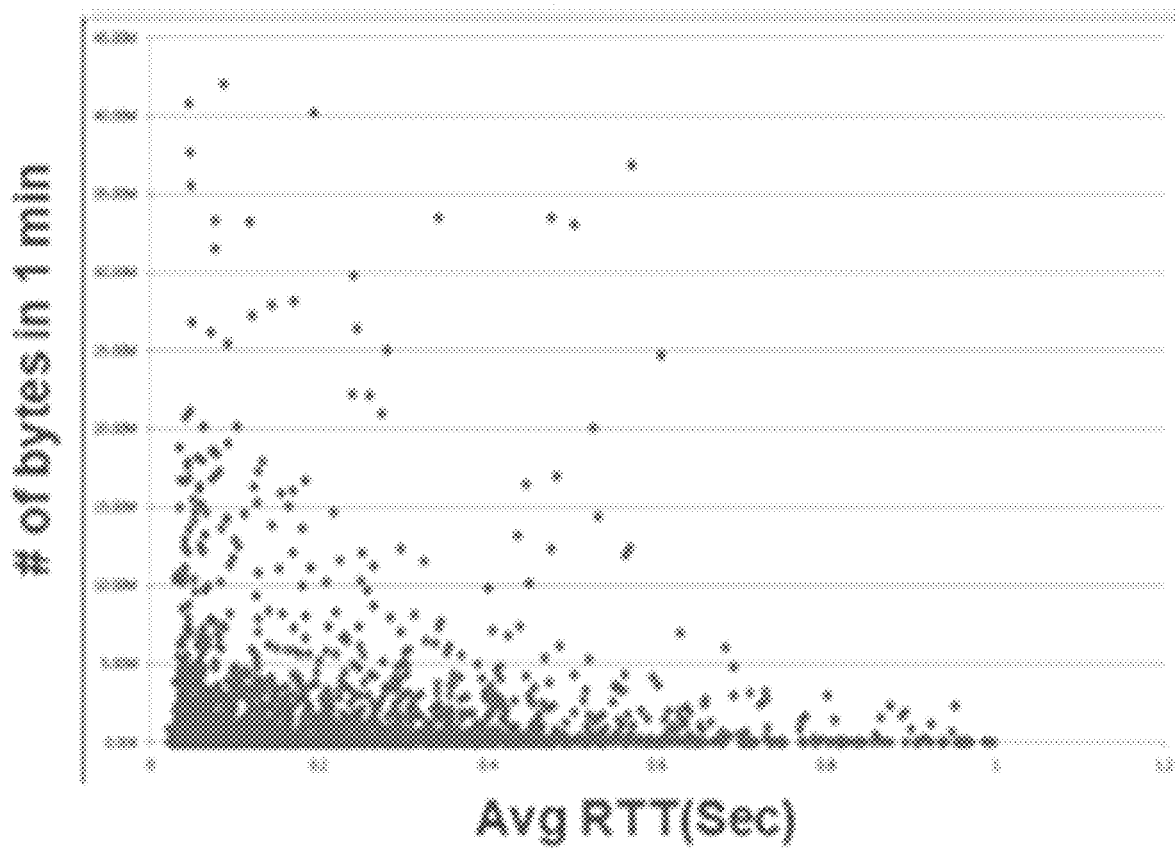
FIG. 4 is a graph illustrating throughput vs. RTT for active subscribers of a network.

FIG. 4 shows data traffic measurements from a cell with active subscribers in an LTE network showing the distribution of user throughputs and e2e RTT. These measurements were taken at the SGi interface. For the purposes of illustration, only RTT and Throughput measurements are shown, but it will be understood that other measurements may be available and may be analyzed by the system.

The system commences by determining whether the cell is congested. In some cases, the system observes and measures Throughput and RTT per user at a predetermined interval, for example, every minute. The predetermined time interval may be preconfigured into the system and may be configurable to be amended to a different time interval. For example, using the data from the cell, every one minute interval the mean and standard deviation (std-dev) of RTT and the mean and std-dev of Throughput are calculated for the users of the cell currently being analyzed.

The mean RTT of each user is reviewed against a baseline RTT value. The baseline RTT value may be predetermined, or may be set by the system. In some cases, if set by the system, the baseline may be the 10th lowest percentile RTT measured. Other percentiles may be used. If the mean RTT is significantly higher than baseline RTT, then the cell is tagged as congested. In some cases, if there are two standard deviations between the mean RTT and the baseline RTT the cell will be tagged as congested.

As noted above, the system may then identify the outliers amongst the users. In this example, the outliers may be referred to as Heavy Users (HU) and Suffering Users (SU) as shown in FIG. 5A.

In this example, Heavy Users (HU) are those whose application throughput>a configurable HU threshold. In some cases, the configurable HU threshold may be equal to mean+3*std-dev. It will be understood that other multiples of the standard deviation or thresholds may be used.

In this example, Suffering Users (SU) are those whose RTT>a configurable SU threshold. Thresholds settings are described in further detail below. For example, the configurable SU threshold may equal to mean+2*std-dev. It will be understood that other multiples of the standard deviation may be used.

Figure 5A:
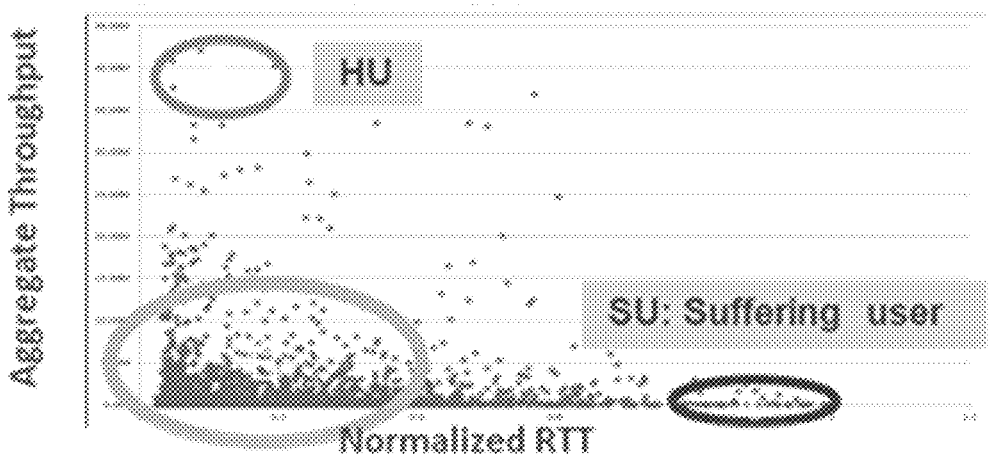
FIGS. 5A and 5B illustrate identification of heavy users and suffering users.
Figure 5B:
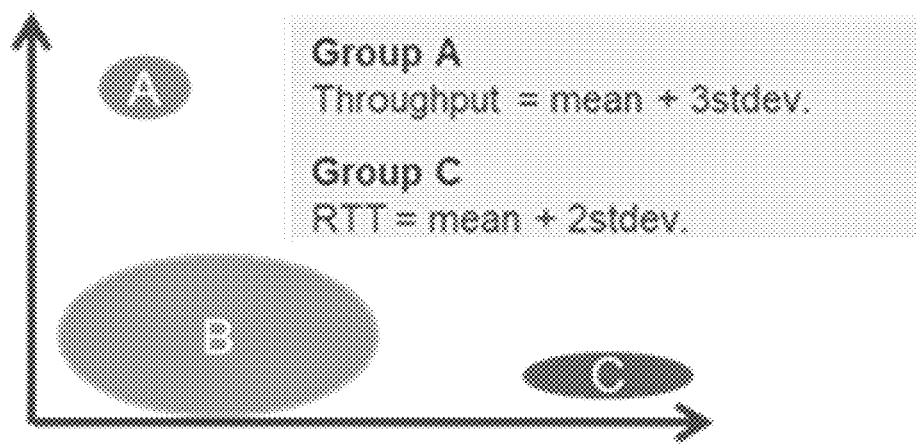

FIGS. 5A and 5B illustrate the identification of Heavy Users and Suffering Users where Group A is a group of Heavy Users, Group C is a group of Suffering Users and Group B is a group of subscribers expected to be experiencing an appropriate level of QoE.

The shapers of the system may then shape the traffic by deprioritizing the HUs. Deprioritize HU is intended to help improve the SU QoE. The deprioritization is intended to be done through shaping of the traffic of selected HUs and observing the impact on QoE of the Suffering Users (SU). Of the HU, the system is intended to shape only selected users, by determining which user is less likely to experience a loss of QoE based on various traffic characteristics.

In this example, the users to shape may be based on factors such as device size (for example, small, medium, large), application type, user profile/quota, and application specific QoE metrics. In other cases, more or fewer factors may be used in determining which HUs to shape. The most effective shaping decisions would typically consider service plans for individual users. Users exceeding their service plans may be shaped first, compared to users who have not exceeded their service plans. Another effective shaping decision may consider the screen size of the end users. Users with smaller screen sizes would generally observe minimal impact on the Quality of Experience due to shaping, compared to users with larger screen sizes.

Having the flows shaped based on the user factors is intended to allow for flows on a mobile phone device deprioritized more often than a larger tablet device for the same throughput/RTT. Further, users whose quotas are close to being reached may be shaped more often than users whose quotas have not been reached. In some cases, crude mobility estimates may be used to decide which users to shape. For example, if the cell id changed frequently in a certain interval, it indicates the user has higher mobility and these users may be shaped less compared to a user that is relatively stationary. Mobile users are likely to experience higher fluctuations in the channel conditions, compared to stationary users. Selectively shaping the stationary users more compared to the mobile users allows the mobile users the flexibility to use additional radio resources when their channel conditions degrade for short periods of time.

The frequency of shaping may be done at a predetermined recurring interval, for example, every 30 seconds, every minute, every 5 minutes, every 10 minutes or the like.

The amount to shape the HUs (Degree of Shaping) may depend on a variety of factors. The degree of shaping is a metric that may be used to determine how aggressively to shape. In some cases, the degree of shaping could be done by 5% at every 1 minute interval in steps. In other cases, other shaping intervals may be used, or a network operator may specify the shaping interval. As the throughput values of Heavy Users may be continually measured on predetermined intervals, the system can determine how much to shape the traffic of the heavy users as well as track the current degree of shaping already being applied.

Further, fine grained tuning may be included, for example, the shaping determination can be application aware. Heavy users with specific applications, for example, p2p, ftp flows or the like, may be more heavily prioritized (for example, 10%) compared to other applications such as streaming video (for example, 5%) even though they may have similar throughput consumptions. The degree of shaping can often be a non-linear function amongst the different variables and in some cases may involve table lookups depending on which parameters are invoked.

The system may then measure the QoE of the Suffering Users to determine whether to continue shaping. The determination of how long to continue shaping may depend on improvement in QoE of SU (which may further depend on the data stream of the SU, for example, Video, Voice, Data) where, in one example, QoE may be:

QoE of SU=alpha1*#voice_SUs*Voice QoE metric (MOS)+alpha2*#uvideo_SU*Video QoE metric+alpha3*#data SU*Data QoE metric Alpha1, alpha2, alpha3 are predetermined or configurable parameters. Calculating the QoE of the SU may be done on regular intervals, for example, every 30 seconds, every 1 minute, every 5 minutes, or some operator specified shaping interval. Calculating the QoE of the SU at a predetermined and regular interval allows for the system to determine whether further shaping would be advantageous. It will be understood that different flows may also be considered and different parameters may be associated with the various flows.

It will be understood that the above equation may not necessarily be the specific mathematical formula defining the metric, but is given as an example. A smoothing function or some method of stabilization may also be included for determining the QoE of SU. Additionally, the QoE of HU's may not be required as the system expects that QoE of HU will decrease as they are more heavily deprioritized. If the system does not observe an improvement in QoE, the system may revert the deprioritization on HU's. The system is intended to only deprioritize Heavy Users so long as it results in noticeable improvement in QoE for the other users of the cell, and in particular, the suffering users.

An example interpretation of the above is as follows:

Amongst the SUs, the QoE can be measured through a variety of application specific metrics.

For Voice users: If Voice MOS score<Acceptable MOS, keep shaping as above until Voice MOS is acceptable. In some cases, the acceptable MOS score metrics can be defined by the operator. In other cases, the acceptable MOS may be predetermined by the system.

For Web users: If Download time>mean+k1*std-dev, keep shaping as above until Download time<mean+k2*std-dev.

For Video users: If the jump in the quality levels (# of quality level shifts beyond k3 levels in 5 min)>Threshold, keep shaping as above till # of quality level shifts beyond k3 levels in 5 min<threshold.

Figure 6:
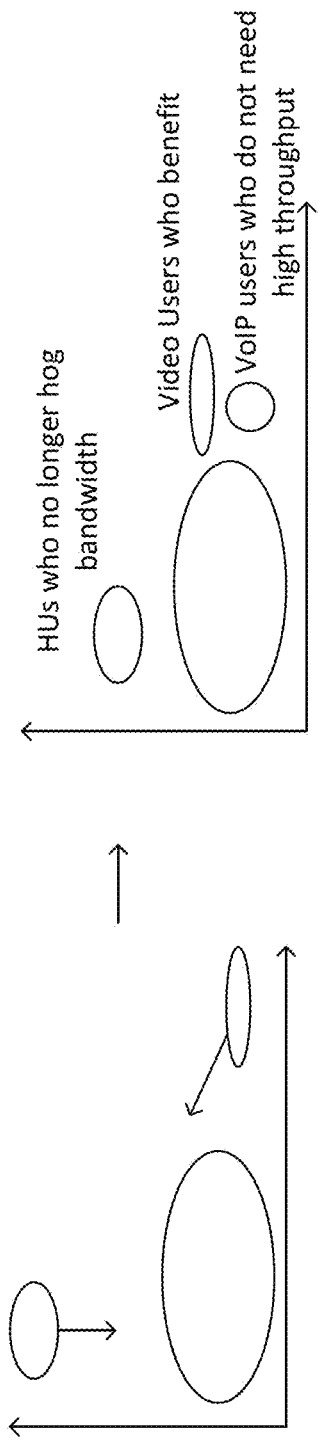
FIG. 6 illustrates the impact of Core based RAN congestion management.

For Gaming users: If RTT>mean+k4*std-dev, keep shaping as above till RTT<mean+k4*std-dev The variables k1-k4 are intended to be configurable numbers. It will be understood that different equations or standards may be used to determine the QoE of the suffering users. FIG. 6 illustrates the movement of HU and SU within the graphs of FIGS. 5A and 5B.

Since the QoE is measured periodically, for example, every one minute, it is intended to be a stateless solution. The term stateless is applied as with every iteration interval, the method begins from the same starting state and executes the logical flow to determine the appropriate actions for that iteration interval. However, there may be values that are monitored and stored from iteration to iteration such as number of suffering users, previous SU QoE, and the like, which does allow the method to be slightly stateful.

In the simplest case, the method and system may use the e2e RTT as a metric for user QoE. The system may continue shaping until the e2e RTT of all the suffering users improves. Thus, when to stop shaping would depend on the distance metric between HU and SU as computed on the Throughput-RTT plane. In some cases, the QoE may be measured in other manners, for example, as noted above for the QoE of SU.

A method for the implementation of the congestion management through selective traffic shaping is described below with reference to a simple case where Throughput and end-to-end RTT between the core network and the UE is used as a measure of application QoE metric. The same or similar principles would apply if any other application specific QoE metric (for example, Video QoE metric, and/or Voice MOS scores, Web download time, or the like) were used as a substitute for end-to-end RTT.

Figure 7A:
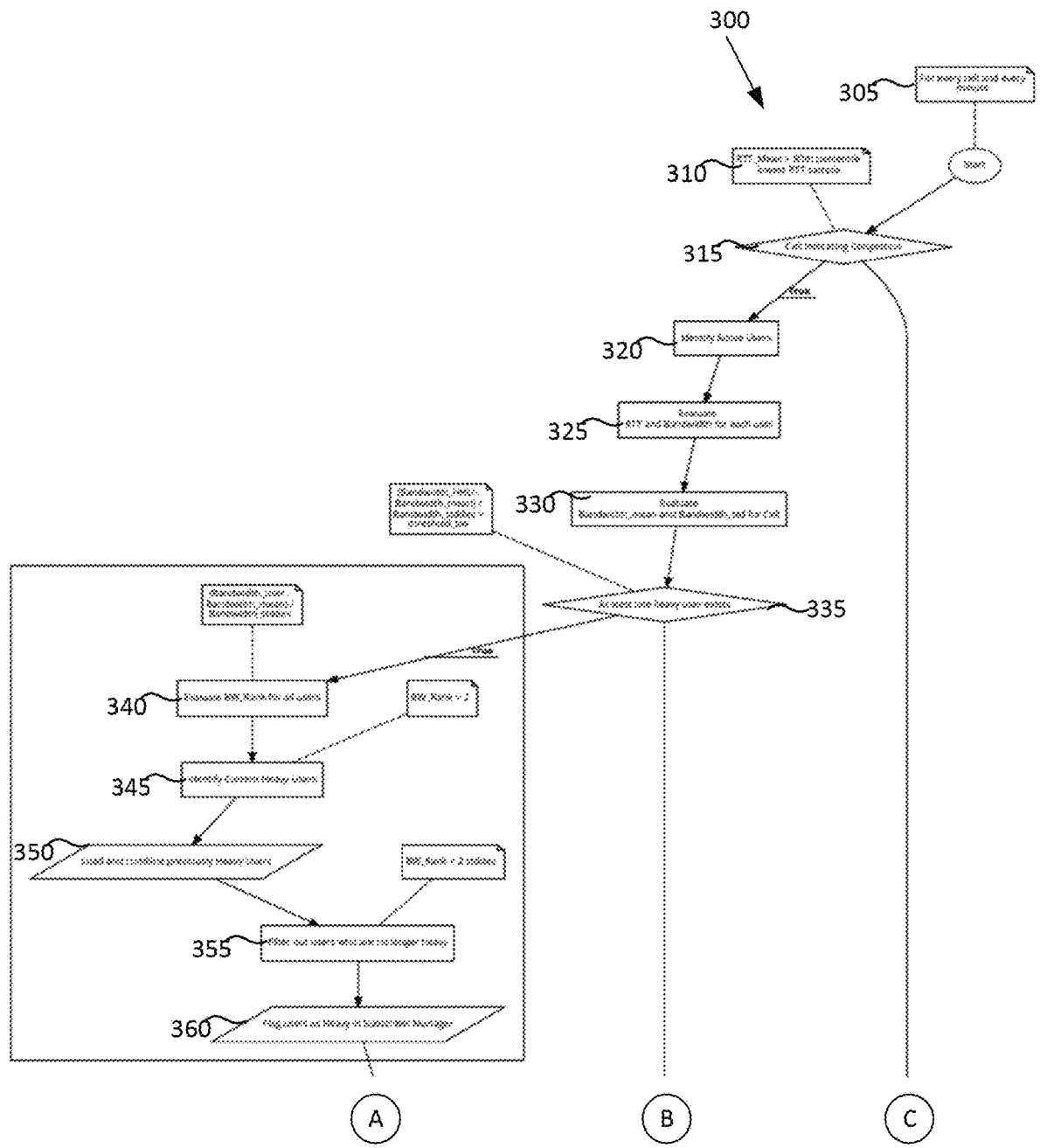
FIGS. 7A and 7B illustrate a specific example of an embodiment of the method for application aware congestion management.
Figure 7B:
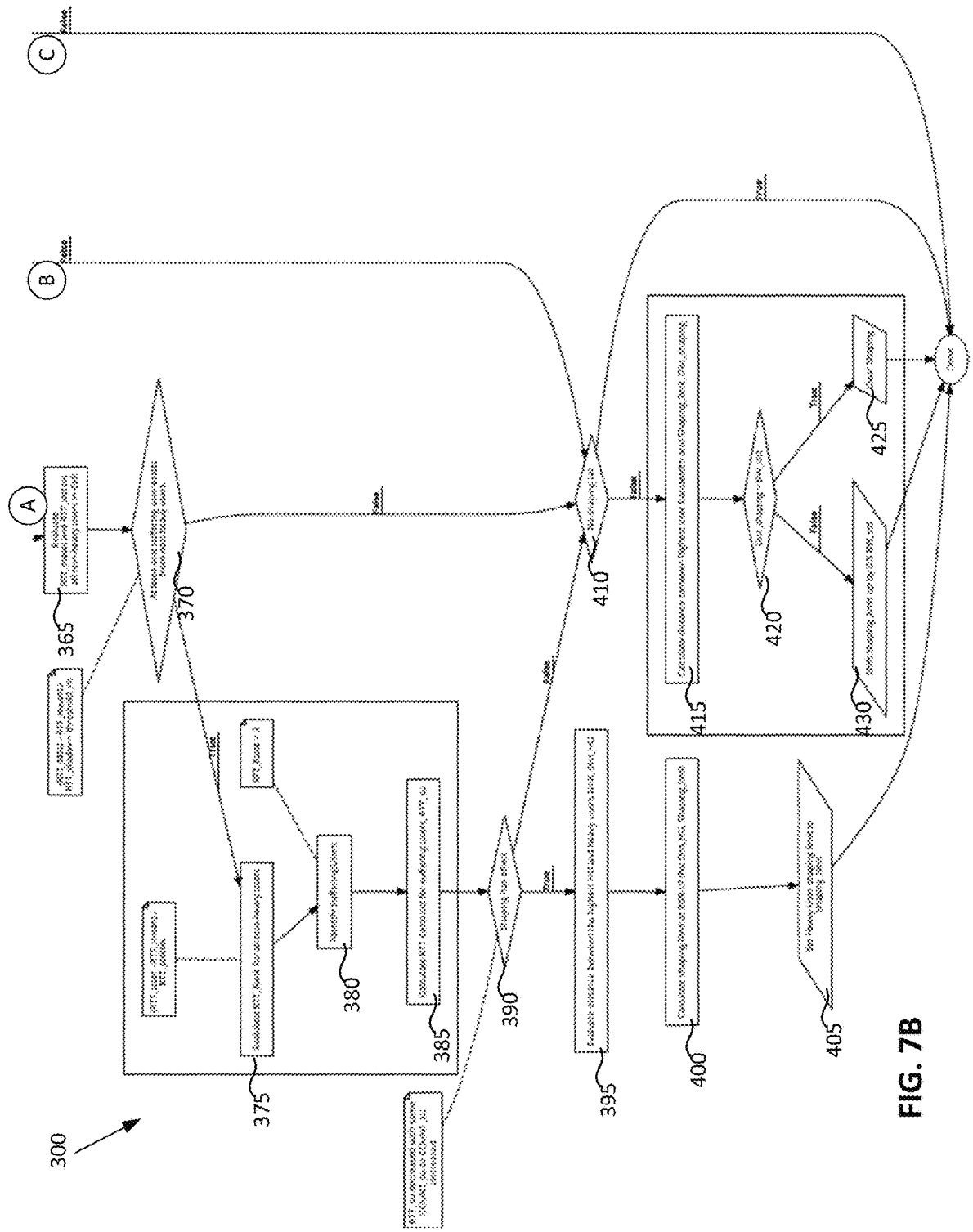

FIGS. 7A and 7B illustrate a specific example of an embodiment of a method 300 for application aware congestion management. The system may monitor a network at a predetermined time period, for example, one minute, and a plurality of cells for the network (305) to determine if any particular cell is congested at 305. In this example, every 1 minute the system may request and/or receive a snapshot of traffic measurements. The RTT and bandwidth may be calculated on a per user basis. The system may then compare the mean RTT of the users against a baseline RTT value at 310. The baseline RTT value in this example may be the 10th or 20th lowest percentile RTT measured. Congestion may be defined as occurring when for active users of the cell, for example, there are HU's that have throughputs at least two standard deviations above the mean, and SU's have RTTs at least two standard deviations above the mean. In specific experimentation, it was found that this definition correlated with expected time of day congestion. Heavy user's may be flagged by the system and on subsequent review of the traffic, if a user is no longer a heavy user, the user may be removed from the set of heavy users and no longer flagged by the system. The distance (i.e. the gap based on a metric or a combination thereof) between the heavy users and the suffering users may be determined. This distance may be reviewed on subsequent iterations to ensure that the shaping is having a desired effect with respect to the overall QoE of the users. If the shaping is not having the desired effect, the system may cease to shape the traffic.

If the cell indicates congestion at 315, then the system identifies the active users in the cell at 320, and in particular, those users that are sending traffic in the downlink or uplink where users may be considered active if they were on this cell for at least 3 minutes in the previous 5 minute period. It will be understood that other active thresholds may be used.

For each active user, the system evaluates the average internal RTT and the total downloaded bytes in the last minute, at 325. In this example, the average internal RTT will be referred to as RTT and the total downloaded byes will be referred to as Bandwidth (BW).

For all active users in the cell, the system evaluates the overall mean RTT (RTT_mean), std-dev RTT (RTT_std-dev), mean Bandwidth (Bandwidth_mean), std-dev Bandwidth (Bandwidth_std-dev) at 330.

Once the initial calculations are complete, the system may then identify the HU and SU's. The system is configured to determine whether there is at least one Heavy User and at least one Suffering User at 335.

A user is identified as being a Heavy User based on how far the user's bandwidth is away from the bandwidth mean. (Bandwidth−Bandwidth_mean)/Bandwidth_std-dev>threshold_bw is satisfied. In this example, the threshold_bw may be a default value, for example 3. The threshold_bw is intended to be fairly high in order to be selective in identifying heavy user.

If at least one heavy user is found, or TRUE is returned from the above, then the system may identify whether a Suffering User exists based on how far the user's RTT is away from the mean (RTT−RTT_mean)/RTT_std-dev>threshold_rtt is satisfied. In this example, the threshold_rtt may be defaulted to 2.

If the system does not identify either HU or SU, then the system may back off shaping by a percentage, for example, 3%, 5% 10% or the like.

For all active users, the system evaluates RTT_Rank and BW_Rank, at 340, where they may be evaluated as follows:

RTT_Rank=(RTT_user−RTT_mean)/RTT_std-dev,

BW_Rank=(Bandwidth_user−Bandwidth_mean)/Bandwidth_std-dev

All users that have RTT_Rank greater than 2, they are considered as suffering users (SU) and the system evaluates their centroid, RTT_su which equals to the average value of their RTT_Rank's.

All users that have BW_Rank greater than 2 are identified as heavy users at 345 (HU) whom the system may further evaluate and plan to shape. The identified HUs are combined with previously identified HUs at 350. The users are reviewed to determine if any previously identified user should be filtered out at 355. The users are then flagged as candidates to shape at 360.

The system, or a shaper operatively connected with the system may, then shape the traffic by deprioritizing the HUs. In order to shape the traffic gradually, the system measures the distance between the highest HU to the threshold value (3), and may use 80% of this distance as the shaping limit. For example if the highest HU is at 9, then the system may use (Bandwidth_mean+y*Bandwidth_std-dev) as the shaping limit, where y=3+0.8*(9−3)=7.8. The total shaping for the heavy users is equal to the shaping limit*the number of users. More generally, y=f(threshold_bw, Bandwidth_mean, Bandwidth_std-dev). It would be understood that the above linear function could be replaced by another function that would allow for the deprioritizing of the HUs' traffic. For example, one such an function may be an exponentially decaying function such as y=threshold_bw+k*e^(Bandwidth_std-dev−Bandwidth_mean).

The system further evaluates the RTT_mean and RTT std on all non-heavy users in the cell at 365. If at least one suffering user exists, at 370 the system will deprioritize at least one heavy user. The RTT_rank is determined for all non-heavy users at 375 and suffering users are identified, at 380, for example, users with RTT_Rank greater than 3. At 385, the system calculates the RTT centroid for the suffering users.

The system may then measure the QoE of suffering users and continue to apply shaping accordingly. The system is intended to determine if the shaping has effect at 390. This may be repeated continuously or at predetermine intervals until the application QoE metric of the suffering users improves. These application QoE metrics could be web download time, Video quality level shifts, Voice MOS scores or the like. In a simple example, the QoE metric could be RTT. As the Heavy Users, after being shaped, are unable to be allocated as many PRBs as before, the PRBs may then be allocated to the remaining users within the cell. As more PRBs are available to be allocated to the SUs, the QoE of the users is intended to be improved. In some cases, shaping may be applied as long as the number of SUs continues to decrease or the RTT for the SUs is decreasing.

In this case, the system may continue to repeat the applying traffic shaping while the RTT_su is decreasing, otherwise increment the shaping level, or in other words apply less shaping. RTT_su is a measure of the improvement of RTT for the SU. If the RTT_su does not change despite shaping for say 3 attempts (where the number of attempts is configurable), then it indicates that the users are likely at the cell edge. Shaping of heavy user traffic may not have any significant impact on the suffering users because the suffering users are likely suffering from inter-cell interference from neighboring cells.

In some cases, the system may evaluate the distance between the highest HU and heavy user limit (Dist_HU), at 395. The system may calculate a shaping limit at 80% of the Dist_HU, at 400. The shaping limit may then be set for each Heavy User to be shaped, at 405.

In some cases, the system may determine that the shaping has no effect, or that shaping has not been set, at 410. In some cases, the system may then calculate the distance between the highest user bandwidth and the shaping limit (Dist_shaping), at 415. The system may then determine if the Dist_shaping is greater than the bandwidth standard deviation, at 420. If the BW std is greater, the shaping may be cleared at 425. If the Dist_shaping is greater, the shaping limit may be increased, by for example, half of the BBW_std, at 430. The method for increasing the shaping rate may follow additive increase, the method for decreasing the shaping rate could follow multiplicative decrease (AIMD).

Based on the last iteration, when the congestion is resolved, the shaping level may keep increasing (less shaping) until the system is able to stop shaping altogether.

This method can be stateless—it is applied, for example, every 1 minute in its entirety—so that even if users join or leave this method will continue to work. The method does apply contextual awareness information such as traffic flow application or device type or other traffic flow criteria to rely on a stateful analysis of the traffic flows. There is intended to be no need to maintain any other state information. During the testing of this method, the system may tweak elements, for example, changing the value of k, to maintain minimal state information in case the system observes oscillatory behavior.

Oscillatory behavior may be observed if the heavy users are shaped such that in the next iteration the cell is found to have no congestion. The shaping may be removed, and, as a result, the heavy users again build up causing congestion requiring shaping to be invoked again. The process of shaping and removal of shaping may become an oscillatory behavior. The method described herein is intended to efficiently shape the traffic of a cell gradually to minimize the occurrences of such oscillatory behavior.

In the above example, the constants used were as follows:
threshold_bw=3
threshold_rtt=2

The variables that are measured every 1 minute were as follows:
Each user: RTT for each application over 1 minute
Each user: Throughput for each application over 1 minute
The system then computes the following:
Each user: RTT over all his/her applications
Each user: mean throughput over all his/her applications
Mean and Std Dev RTT for aggregate traffic.
Mean and Std Dev Throughput for aggregate traffic.

$$RTT\_Rank(per\ user) = (RTT\_user - RTT\_mean)/RTT\_std\text{-}dev$$

$$BW\_Rank(per\ user) = (Bandwidth\_user - Bandwidth\_mean)/Bandwidth\_std\text{-}dev$$

RTT_su=mean of RTT_Rank's for all the suffering users.
The terminology used for the above example:
SU: RTT_Rank>threshold_rtt
HU: BW_Rank>threshold_bw The result of deprioritization is that resources will be shifted from the heavy users to the typical users that include normal users and suffering users. The suffering users are those whose mean RTT is high and whose throughputs are low.

The solution is intended to reduce congestion for contending normal and suffering users, and increases the availability of radio resources for allocation to those users by the RAN eNodeB algorithm. This solution is intended to improve the throughput and QoE for typical cell users. It does so by providing a layer of scheduling above the RAN scheduler to enable a more effective allocation of resources needed to deliver optimal user QoE. It is intended to improve the performance because it takes into account the end-to-end network performance statistics, device screen sizes, specific application types, and the like in deciding which users to shape and the extent of the shaping. As only a few HUs will experience deprioritization, it is expected that the QoE will remain unchanged or improve for most cell users.

However, if there is no congestion at certain times, meaning that there is plenty of air interface [radio] resources available, deprioritization does not unduly penalize the heavy users. It is intended that this allows for better congestion management during varying time periods.

Generally speaking, standardization is needed for this solution—as it relies on observation of data statistics at SGi interface.

In the preceding description, for purposes of explanation, numerous details are set forth in order to provide a thorough understanding of the embodiments. However, it will be apparent to one skilled in the art that these specific details are not required. In other instances, well-known structures are shown in block diagram form in order not to obscure the understanding. For example, specific details are not provided as to whether the embodiments described herein are implemented as a software routine, hardware circuit, firmware, or a combination thereof. It will be understood by one skilled in the art that elements of one embodiment may be used in other embodiments in appropriate circumstances. Further, each embodiment may not require all elements described unless specifically stated as such.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for congestion management on a network, comprising:
    determining that a cell on the network is congested;
    identifying at least one suffering user on the cell, wherein the at least one suffering user has Quality of Experience (QoE) below a predetermined configurable suffering threshold;
    determine traffic flow criteria of the at least one suffering user; and
    shaping network traffic of at least one other user based on the traffic flow criteria, until a predetermined threshold is reached.

2. A method according to claim 1 further comprising:
reviewing the QoE of the at least one suffering user at a predetermined interval to determine if the QoE is improving.

3. A method according to claim 2 wherein the predetermined interval is every minute.

4. A method according to claim 1 further comprising:
reviewing the QoE of all users of the cell to determine whether there is at least one heavy user, wherein the at least one heavy user has an application throughput greater than a configurable heavy threshold; and
shaping network traffic of at least one heavy user based on the traffic flow criteria until there is no longer any suffering user.

5. A method according to claim 1 further comprising:
reviewing the QoE of all users of the cell to determine whether there remains at least one heavy user and at least one suffering user; and
continuing to shape network traffic of at least one heavy user based on the traffic flow criteria until there is no longer any improvement to user QoE.

6. A method according to claim 1, wherein the traffic flow criteria comprise at least one of: application type, device type, user quota, device screen size, subscriber location, subscriber mobility, time of day.

7. A method according to claim 1 wherein determining whether the cell is congested is based on the Throughput, Round Trip Time and Loss experienced by subscribers using the cell.

8. A method according to claim 1 further comprising:
determining whether an average user QoE for the cell is higher than before shaping; and
if the average user QoE is not higher, ceasing to shape the traffic of the at least one other user.

9. A method according to claim 4, wherein the configurable heavy threshold may be equal to a mean throughput for the cell plus a multiple of a standard deviation of the throughput.

10. A method according to claim 1, wherein the configurable suffering threshold is equal to a mean round trip time plus a multiple of a standard deviation of the round trip time.

11. A method according to claim 4, wherein the at least one heavy user may have an application throughput greater than the configurable heavy threshold and the at least one suffering user may have round trip time greater than the configurable suffering threshold.

12. A system for congestion management on a network comprising:
a Quality of Experience (QoE) module configured to determine that a cell on the network is congested;
an analysis module configured to identify at least one suffering user on the cell and determine traffic flow criteria of the at least one suffering user, wherein the at least one suffering user has Quality of Experience (QoE) below a predetermined configurable suffering threshold; and
at least one shaper configured to shape network traffic of at least one other user based on the traffic flow criteria of the suffering user.

13. A system according to claim 12 wherein the analysis module is further configured to:
review the QoE of the at least one suffering user at a predetermined interval to determine if the QoE is improving.

14. A system according to claim 12 wherein the analysis module is further configured to:
review the QoE of all users of the cell to determine whether there remains at least one suffering user; and
the at least one shaper is configured to continue to shape network traffic of the at least one other user based on the traffic flow criteria until there is no longer any suffering user.

15. A system according to claim 12 wherein the analysis module is further configured to:
review the QoE of all users of the cell to determine whether there remains at least one suffering user; and
the at least one shaper is configured to shape network traffic of the at least one other user based on the traffic flow criteria until there is no longer any improvement to user QoE.

16. A system according to claim 12 wherein determining whether the cell is congested is based on the Throughput, Round Trip Time and Loss experienced by subscribers using the cell.

17. A system according to claim 12, wherein, if the analysis module determines whether an average user QoE is not higher than prior to shaping, the at least one shaper ceases to shape the traffic of the at least one heavy user.

18. A system according to claim 12 wherein, a heavy user may have an application throughput greater than a configurable heavy threshold and a suffering user may have round trip time greater than a configurable suffering threshold.

19. A system according to claim 18 wherein, the configurable heavy threshold may be equal to a mean throughput for the cell plus a multiple of a standard deviation of the throughput.

20. A system according to claim 18 wherein, the configurable suffering threshold is equal to a mean round trip time plus a multiple of a standard deviation of the round trip time.

* * * * *